United States Patent
Rosenberg

[11] 3,765,537
[45] Oct. 16, 1973

[54] DUAL BLOOD FILTER
[75] Inventor: David J. Rosenberg, Glen Cove, N.Y.
[73] Assignee: Pall Corporation, Glen Cove, N.Y.
[22] Filed: July 31, 1972
[21] Appl. No.: 276,623

Related U.S. Application Data
[63] Continuation-in-part of Ser. No. 38,356, Nov. 10, 1970, Pat. No. 3,701,433, and a continuation-in-part of Ser. No. 263,584, June 16, 1972.

[52] U.S. Cl.................. 210/446, 210/493, 210/499
[51] Int. Cl............................................ B01d 35/28
[58] Field of Search ................... 128/214 B, 214 C; 210/446, 493, 499, 505, 507

[56] References Cited
UNITED STATES PATENTS
| | | | |
|---|---|---|---|
| 2,473,153 | 5/1949 | Lager | 128/214 C |
| 2,571,059 | 10/1951 | Puschelberg et al. | 210/507 X |
| 2,644,586 | 7/1952 | Cutter | 128/214 C X |
| 2,914,181 | 11/1959 | Naftulus et al. | 210/446 |
| 3,448,041 | 6/1969 | Swank | 210/446 X |
| 3,557,786 | 2/1971 | Barr, Sr. | 128/214 C |
| 3,701,433 | 10/1972 | Krakauer | 210/446 X |

Primary Examiner—Samih N. Zaharna
Assistant Examiner—Richard W. Burks
Attorney—John R. Janes

[57] ABSTRACT

A disposable filter element is provided, capable of passing human blood at a high flow rate and useful in human blood transfusion systems, to remove undesired suspended particles, substantially without removal of normal and desirable blood components, comprising in combination two filter elements, the first comprising plastic netting and having a pore size within the range from about 800 to about 4,000 microns, and the second a woven square weave plastic mesh having a pore size within the range from about 20 to about 50 microns.

32 Claims, 6 Drawing Figures

PATENTED OCT 16 1973 3,765,537

DUAL BLOOD FILTER

This application is a continuation-in-part of Ser. No. 88,356, filed Nov. 10, 1970, now U.S. Pat. No. 3701433 granted Nov. 21, 1972, and Serial No. 263,584, filed June 16, 1972.

There are in general two types of blood filter available on the market for use in human blood transfusions. The most common type is made of wire mesh, or nylon or polyester filament mesh, having a pore size within the range from about 125 to about 140 microns (Surgical Advances, Vo. II, No. 6, September, 1951). These filters are referred to as blood strainers. They are very coarse in pore size, because they have a strong tendency to block quickly if the pore size is any finer.

The other type of blood filter useful in transfusions is a rather thick nonwoven fibrous mat, usually of polyester fibers, and referred to as a Dacron wool filter. This filter is the subject of U.S. Pat. No. 3,448,041 tp R. L. Swank, issued June 3, 1969, The filters available commercially have a pore size up to several hundred microns, and are prepared of very fine fibers.

The principle upon which the Swank filter is based is described in the patent at column 3, starting at line 51 and continuing through column 4, line 36. Swank wanted a finely subdivided material having surface characteristics and a size such that it selectively collects the storage-altered components of blood used in blood transfusions. The filter is intended to act as a base to which the adhesive storage-altered platelets and leucocytes adhere. Free passage of the other blood components is supposed to be permitted by the filter, which has a large area of absorbing surface, to achieve a high capacity with a minimum apparatus size. Swank also wanted a material which could be used over long operating periods without collapse or plugging, and without being affected adversely by repeated subjection to heat and chemical sterilization.

The problem of blood strainers is that they do not remove enough of the small finely-divided material, because of their large pore size. On the other hand, the nonwoven fibrous mat filters are at the other extreme. Despite their large pore size, in excess of 100 microns, these filters remove too much material, and also have a very high tendency to block. Large numbers of platelets and white blood cells and bodies of like size in the blood tend to be strained out, leading to rapid blocking, and a compression of the mat under the increased fluid pressure differential thereacross. Both of these effects are undesirable. These results are reported by Egeblad, Osborn, Burns, Hill and Gerbode, The Journal of Thoracic and Cardiovascular Surgery, Vol. 63, No. 3, March, 1972, pp. 384–390; and by McNamara, Burran and Suehiro in a paper entitled "Effective Filtration of Banked Blood," (a copy of this paper is in the file of U.S. application Ser. No. 88,356, filed Nov. 10, 1970).

Egeblad et al. report that they had good results using the Dacron wool filter during perfusion for open-heart surgery, where the filter was placed in the line between the cardiotomy reservoir an the main venous line, in which position a large proportion of the circulating blood system bypasses the filter. Such a system requires a much higher rate of flow of blood per unit of time than a blood transfusion system, so that the results obtained represent results similar to those obtained in blood transfusion, but in a shorter time. When placed in the arterial line, so that all blood coming from the oxygenator was filtered, a pressure gradient was built up across the filter, necessitating a switch to another filter hooked up in parallel to the first; and also air was trapped in the filter during initial filling, and was found to be possibly ejected later, directly into the arterial line. The blood reached a very low level of blood platelets within the first 10 minutes of use of the filter, and this condition persisted during the entire period of bypass. There was also a drop in white blood cells, and the decrease in both was much more pronounced than usually seen in heart-lung bypass, showing that the filter caught huge amounts of platelets and, to a lesser extent, white cells. The pressure gradient built up across the filter was in part attribued to this mass of cells, and in part to intravascular coagulation with formation of fibrin trapped in the filter. Moreover, the platelets caught on the filter tended to disintegrate subsequently, and the disintegration products entered the filtered blood.

The invention of Ser. No. 88,356, filed Nov. 10, 1970, provides a disposable filter element comprising a woven square-weave plastic mesh of polyester monofilaments having a pore size within the range from about 25 to about 50 microns, the filaments being locked in place at their crossing points, and the filaments having a diameter within the range from about 25 to about 50 microns. Such filter elements are capable of removing microemboli from human blood in human blood circulation systems that require circulation of the blood at a high flow rate without removal of normal and desirable blood components. The filter removes not only microemboli but also lipids and debris and gas emboli, and it also has a low resistance at high flow rates and at a high flow capacity, and does not tend to block over long periods of use.

However, for use in blood transfusion, this filter is not fully satisfactory. Blood for use in transfusions has a tendency to contain blood clots, a condition not normally encountered in human blood circulation systems, which utilize the blood of the patient in the circulation system. Blood clots are sticky masses of material, and if large numbers of blood clots are present, the woven square weave plastic mesh can block very quickly.

In accordance with the invention, a dual blood filter element is provided which can be used in blood transfusions without blockage, and which is capable of removing not only large particles, such as blood clots, but also smaller particles, down to approximately $20\mu$ in size, while passing red blood cells and at least a substantial proportion of white blood cells. The blood filter cascade of the invention comprises two filter sheets, arranged in downstream flow sequence in order of progressively increasing fineness, i.e. from coarsest to finest in pore size.

The first filter sheet is coarse open netting of plastic filamentary material having a pore size within the range from about 800 to about 4,000 microns. This pore size is small enough to remove blood clots which range from 500 to 1,000 microns in diameter, and it is coarse enough to do so without being subject to blocking by the blood clots that are strained out.

The second filter sheet is an open- or square-weave mesh fabric of plastic monofilaments, having a pore size within the range from about 20 to about 50 microns. This filter sheet removes microemboli, lipids and debris, and gas emboli, virtually all of the particles that pass through the first filter element except platelets, white blood cells, red blood cells, and other like fine particles.

This combination of filter sheets can be referred to as a cascade, because each succeeding filter sheet in the line of flow removes some of the particles passed by the next-preceding filter sheet. The relative proportion of particles removed by the individual filter sheets of this filter cascade is remarkably distributed between both filter sheets, so that neither filter sheet has a tendecny to block over a given blood transfusion to a single patient. For sanitary reasons, blood transfusion filters are not reused, even for the same patient, if a second transfusion is administered at a later time; and since the filter element cascades of the invention are fully disposable, their use resolves the blocking problem common to blood filters which are fine enough to remove small particles such as the adhesive nonviable platelets.

The first filter sheet has an open-mesh netting structure. It is prepared by extruding, casting, or molding plastic into an open-netting having an integral filamentary structure.

The plastic material used is compatible with blood. Exemplary are polypropylene, polyethylene, polyester, polyamide, and polycarbonate.

One form corresponds to an open square-weave woven filamentary netting, even though it is not manufactured by weaving techniques from filamentary material. An extruded open-mesh plastic filamentary polypropylene sheet is available commercially under the trademark "Vexar."

Other forms of netting are available which do not correspond to an open square-weave fabric. In these, the filamentary plastic material can be arranged in a manner to define round, elliptical, or polygonal openings, which can, for example, be triangular, square, rectangular, pentagonal, hexagonal, heptagonal, and octagonal, singly or in pattern combinations. One design, for example, has triangular openings separated by plastic filamentary material and arranged in groups of six to form a hexagonal pattern, and another has triangular openings arranged in groups of two to form a diamond. The shape of the open pores in the netting is in no way critical, but it is important that the pore size be within the range from about 800 to about 4,000 microns, the pore being measured across the largest and the smallest dimensions, if it is other than round or symmetrical such as square.

The second filter sheet is a woven open-mesh square-weave fabric which can be made of any plastic monofilament compatible with blood, such as polypropylene, polyethylene, polyester, polyamide, and polycarbonate, and has a pore size within the range from about 20 to about 50 microns. The monofilaments have a diameter within the range from about 20 to about 50 microns.

Polyester monofilaments are preferred. Most polyester monofilaments available are polyesters of ethylene glycol and terephthalic acid available under the trademark "Dacron." Polyester monofilaments can also be made of other polymers of alkylene glycols and dicarboxylic acids, usually aromatic acids, but also cycloaliphatic and aliphatic acids, of which propylene glycol-1,2, butylene glycol-2,3 and -1,2, and pentylene glycol-1,2 and -2,3 and -1,3 are exemplary, esterified with terephthalic acid or alkyl-substituted terephthalic acids, or adipic or subaric acids, or cyclohexane-1,4-dicarboxylic acid.

The ehtylene glycol-terephthalic acid polyester monofilaments are preferred because of their availability and low cost. However, polyesters of other glycols and acids can be used.

Exemplary polyester monofilament screen cloths which can be employed as filter sheets in accordance with the invention are made from polyester monofilament 20, 25 and 40 microns in diameter with (a) a mesh opening of 53 microns with 33 percent open area, (b) a mesh opening of 44 microns with 27 percent open area, (c) a mesh opening of 37 microns with 23 percent open area, and (d) a mesh opening of 21 microns with 14.5 percent open area. Similar screen cloths are available, made of polyamide filaments, polyvinylidene chloride filaments, and polypropylene filaments.

It is also preferred that the monofilaments of the woven square-weave mesh be locked in position at their points of crossing. The locking not only increases strength and rigidity, but it also fixes the pores against change in dimensions in use, which is extremely important.

The dual filter sheet cascade of the invention can be fitted into disposable filter elements of any design and configuration. For maximum open area and high flow rate in a confined space the two filter sheets are preferably assembled in close juxtaposition, although they can also be separated by spacers, and both are preferably corrugated or convoluted, to provide a high surface area to flow, together with any spacers present.

The spacer or support material is stiffer than the filter sheets, and is preferably flexible, and also preferably of plastic, so that it can be bonded to the same end cap in a filter element or to the filter bag. The spacer has a pore size at least as large as the first filter sheet, and preferably larger, within the range from about 800 to about 10,000 microns.

As the spacer, any sheet having an uneven surface, such as dimpled, ridged, or quilted, and with large openings therethrough, can be used. Extruded, cast and molded netting are useful, as also are perforated sheets, of polypropylene, polyethylene, polyester, polycarbonate, and polyamide. The surface of the spacer or support is sufficiently uneven so as to provide drainage and prevent blocking of the medium and fine filer sheets by the support sheet. A preferred supporting material is Vexar mesh (extruded polypropylene netting).

The spacers can also assist in retaining the filter sheet cascade in a desired shape, such as particularly a corrugated shape. The spacer if present is usually in close juxtaposition to or in contact with the second filter sheet of the cascade. No spacer sheet need precede or follow the first filter sheet of open netting, bcause of its large pore size.

A suitable configuration of filter element has the filter sheets folded into a corrugated cylinder, the open ends of which are closed off by end caps, limiting access to the filtrate flow line to flow through the filter cascade, the filtrate flow line being in operative connection to at least one of the end caps. The end caps are preferably of plastic material and can, for example, be of polyester or polypropylene or polycarbonate. The end caps can be bonded to the corrugated filter sheet cascade using a potting compound or an adhesive of conventional type. However, to ensure a leak-tight seal, it is preferred to fuse the end caps to the filter sheet cascade, and for this purpose a polyolefin, such as polyethylene or polypropylene, is preferred as the end cap material. Othe plastic materials that can be used as the end caps include polyamides, polycarbonates, and polyester, as well as Teflon polytetrafluoroethylene and Kel-ef polytrifuorochloroethylene, but these are more difficult to bond.

Another suitable form of filter element has the filter sheet cascade and spacer sheets in corrugated form encased in a plastic bag across the line of flow between the inlet and the outlet of the bag, which can, for example, be in the form of line connections such as tubes opening onto opposite sides of the filter sheet cascade. This type is especially useful for attachment to blood transfusion bags, and can be provided with a piercing tube connection for this purpose, if desired.

The cascade filter element of the invention can be used in filter units intended for simple blood transfusion where high flow rates are not encountered, as in drip or gravity flow from blood bags, pump-assisted, if desired. The cascade filter element can accordingly be provided with fittings or line connections suitable to adapt it for in-line connection in blood transfusion systems of any type.

Preferred embodiments of the invention are illustrated in the drawings, in which.

Figure 1:
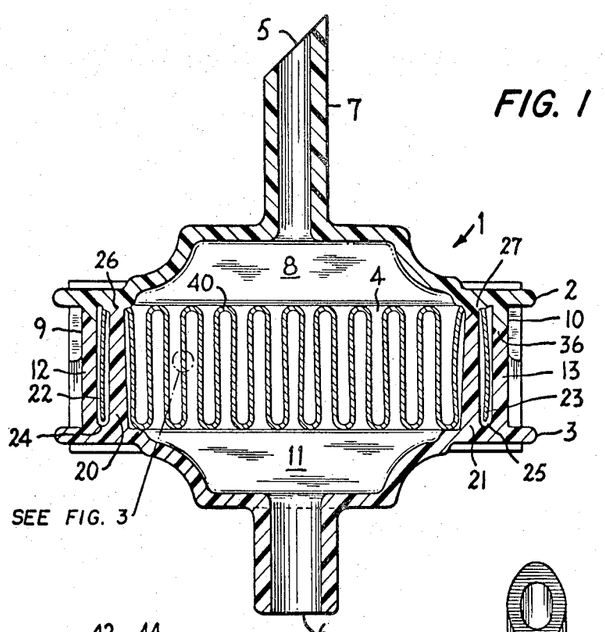
FIG. 1 represents a side view, in section, of a filter element in box form including a dual-filter cascade, in accordance with the invention.
Figures 2, 3:
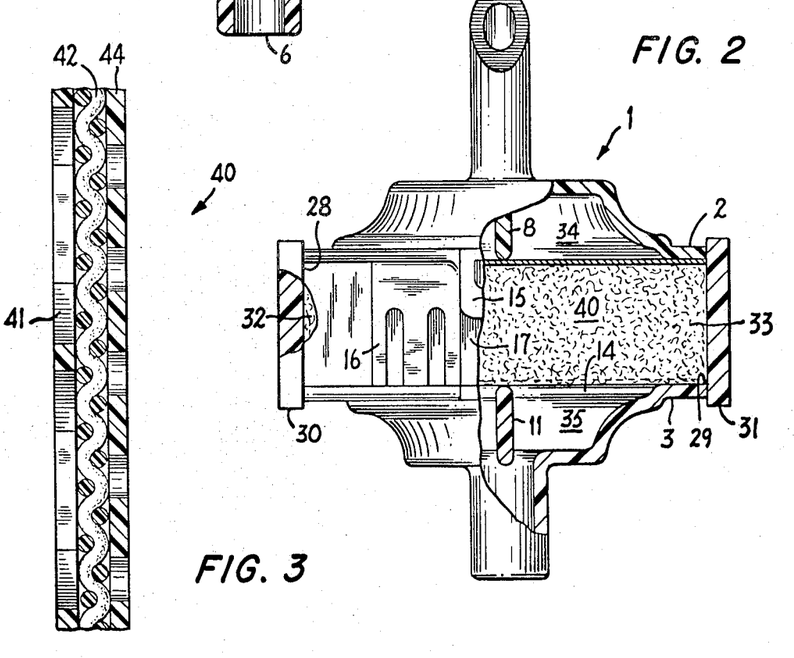
FIG. 2 represents another side view, partly in section, of the filter element of FIG. 1, showing the side caps on the filter housing.
FIG. 3 represents a view in detail of a portion in section shown in FIG. 1 of the filter sheet cascade of the invention.

The filter element of FIGS. 1 through 3 is composed of a housing 1 having first and second housing portions 2 and 3 defining a fluid chamber 4 therewithin. A fluid port 5 is at the base of housing channel portion 2, and a fluid port 6 is at the base of housing portion 3. It will be seen that these ports are coaxial. The port 5 serves as a fluid inlet, and the port 6 as a fluid outlet, and flow is only in the direction from port 5 to port 6, because of the arrangement of the two filter sheets in the cascade, as will be seen.

The inlet port 5 is housed in a spiked tube 7 which is designed to pierce a blood bag stopper for use in blood transfusion. Housing portion 2 has an internal projection or rib 8, extending from one side 9 to the other side 10, and housing portion 3 has a like internal projection 11 extending from one side 12 to the other side 13. These serve as supports extending across the corrugations of the three-component filter sheet cascade and spacer composite 40, serving as the filter.

Each housing portion 2 and 3 is generally channel-shaped, with opposed sides 9 and 10 extending outwardly from the base of portion 2, and opposed sides 12 and 13 extending outwardly from the base portion 3. The bases of housing portions 2 and 3 are each provided with fluid flow channels 14. Portion 2 has on each side a pair of locating fingers 15, and portion 3 has on each side two pairs of locating fingers 16, with a slot 17 therebetween into which fingers 15 fit. These locate the portions 2, 3 on assembly. Sides 12, 13 at their ends abut sides 9, 10, and are fused thereto, so that the housing portions are bonded together as one piece. A pair of projecting members 20, 21 on portion 3 extend parallel to and internally of sides 12, 13 all the way to the internal wall of housing portion 2.

The two-component filter sheet cascade and spacer composite 40 at each edge 22, 23 projects into the sockets 24, 25 defined by sides 12, 13 and members 20, 21, and where the three sheet-composite curves around the tips of members 20, 21, it is held tightly at 26, 27 against the internal wall of portion 2 and is bonded thereto.

The bond is produced by fused integration of the member 20, 21 to the housing portion 2 through the open pores of the two-filter sheets 41, 42 and the spacer 44 forming a fluid-tight seal at 26, 27 all along those sides of the composite, and bonding all three sheets together at those points. Such a bond can be obtained, for example, by ultrasonic welding, by solvent softening, or by heat fusion.

The filter sheet cascade and spacer composite 40, best seen in FIG. 3, is composed at a first coarse filter sheet 41 of extruded polypropylene netting (Vexar), pore size about 1500 microns. The spacer 44 is also made of extruded polypropylene netting (Vexar), of the same pore size, about 1,500 microns. The second filter sheet 42 is made of open-mesh square-weave polyester monofilament fabric having a pore opening of 40 microns, a monofilament diameter of 40 microns and 27 percent open area. The weft monofilaments and the wrap monofilaments are backed together by heat setting at their points of crossing defining fixed 40-micron pores at their interstices.

The two filter sheets 41, 42 of the filter cascade are in corrugated form, for an increased surface area in the limited space of fluid chamber 4, and the tips of the corrugations abut and are held in place by the projecting sections 8 and 11 of the housing portions 2 and 3. The edges 32, 33 of the filter sheet cascade run right to the ends of the sides 12 and 13.

The housing channel portions 2 and 3 are open at their sides and, as best seen in FIG. 2, define openings 28, 29 leading into the fluid chamber 4 of the housing 1. The openings are closed off by side caps 30, 31 which are bonded to the housing portions 2 and 3 and also to the edges 32 and 33 of the filter sheet cascade and spacer composite 40, extending along the openings from end to end between the mating sections 9, 10, 12 and 13 of the housing portions. This closes off the other two side edges of the filter sheet cascade to fluid flow, and restricts flow between the two portions 34, 35 of fluid chamber 4 in the housing via the pores in each of the filter sheets in the filter sheet cascade 40. Thus, all flow between fluid ports 5 and 6 of housing 1 must pass through each of the two filter sheets in the direction 41, 42 as is evident from FIG. 3.

The assembly of the box filter element of FIGS. 1 to 3 is as follows. It will be seen on reference to FIG. 1 that the sides sections 9, 10 12 and 13 of each housing portion 2, 3 have a special construction which ensures a fluid-tight seal between the housing portions when they are bonded together. The opposed sides 9, 10 of housing portion 2 meet and abut like sides 12, 13 of the other housing portion 3. Portion 2 has one pair of each side of side-locating fingers 15, and portion 3 has two pair on each side of side-locating finers 16, receiving fingers 15 therebetween to ensure that the portions fit snugly together in the correct position to hold the filter sheet cascade 40 in place.

The sides 9, 10, 12 and 13 are each slightly longer than their combined length after they are bonded togher. When portions 2 and 3 are fitted together, the sides 9, 10 are readily fused to sides 12, 13, respectively, to produce an integral one-piece structure at the seal 36, FIGS. 1 and 2. Internally of the sides 12, 13 in housing portion 3 are the projecting members 20, 21 which extend all the way to the interior wall at 26, 27 of the housing portion 2.

In assembly, the edges 22, 23 of the corrugated filter sheet cascade and spacer composite 40 are folded around the projecting members 20, 21 of housing portion 3 into the sockets 24, 25 between sides 12, 13 and the projecting members 20, 21, where they are held securely. Housng portion 2 is then fitter over the portion 3, and presed down smartly against the filter sheet cascade and combined spacers, pinching the three sheets at 26, 27 against the tips of projecting members 20, 21, and holding the three sheets firmly in place by the tight engagement between the inner wall of the housing portion 2 and the ends of the members 20, 21. The projecting members 20, 21 are then integrated through the pores of the spacer 44 and the two filter elements 41, 42 at 26, 27 to the wall of the housing portion 2, forming a fluid-tight seal therebetween, and closing off both sides of the filter sheet cascade to fluid flow. The sides 9, 10 of housing portion 2 can also be bonded to the sides 12, 13 of the housing portion 3 by fusion, such as by ultrasonic welding, at the same time or thereafter, so that the two housing portions 2, 3 are sealed together, preventing fluid leakage to the outside of the filter assembly.

Next, the side caps 30, 31 are bonded across the opening 28, 29 into the housing portions 2, 3 and to the filter sheet cascade and spacer composite edges 32, 33, bonding the filter sheet sides and spacers to the side caps, and completing the fixing of the filter sheet cascade and spacer 40 in place in the fluid chamber 4, as well as the seals between the filter sheet cascade and the four side walls of the housing. This can be done using, for example, an adhesive, or a melt of adhesive or resin or other potting composition, or by fusing the end caps. The filter element is now complete, and ready for use.

The filter element is operated in line, as follows. The spiked tip is plunged into the stopper of a blood bag, thereby permitting blood to flow from the bag through the inlet port 5 and enter the channel 14 flowing into chamber portion 34. The blood then flows through the filter sheet cascade 40 via filter sheet 41, filter sheet 42 and spacer 44, and enters the chamber portion 35, whence it emerges via channel 14 from the housing via port 6.

Line connections can be made at ports 5, 6 in any desired manner. Luer locks also can be used, if desired.

Figure 4:
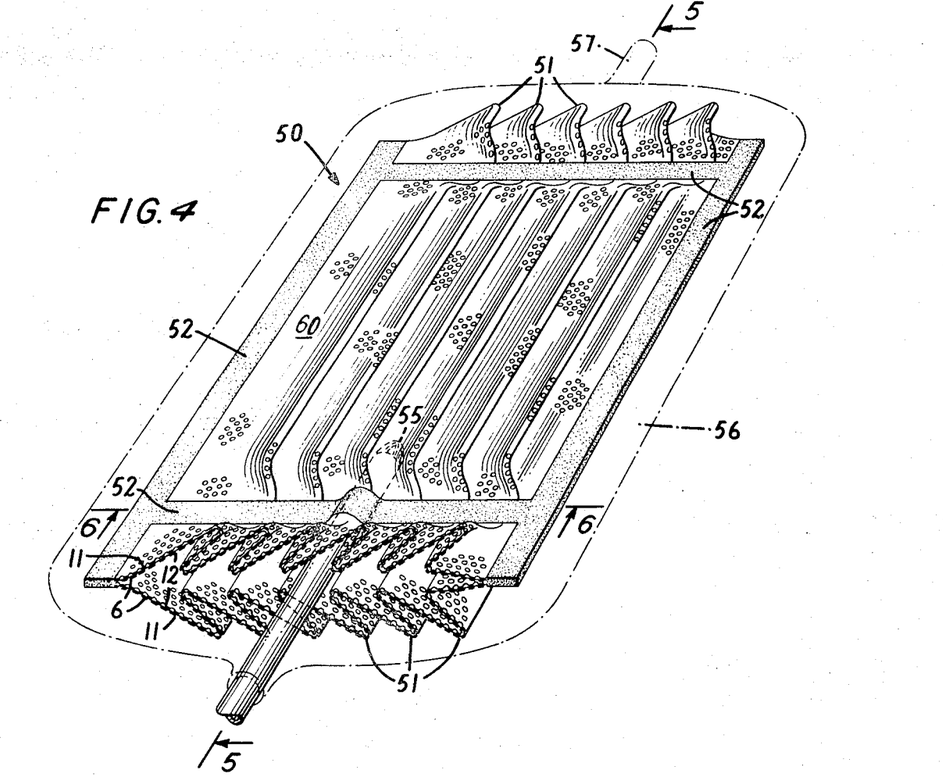
FIG. 4 represents an isometric view of an embodiment of filer element in bag form including a dual filter cascade in accordance with the invention.
Figure 5:
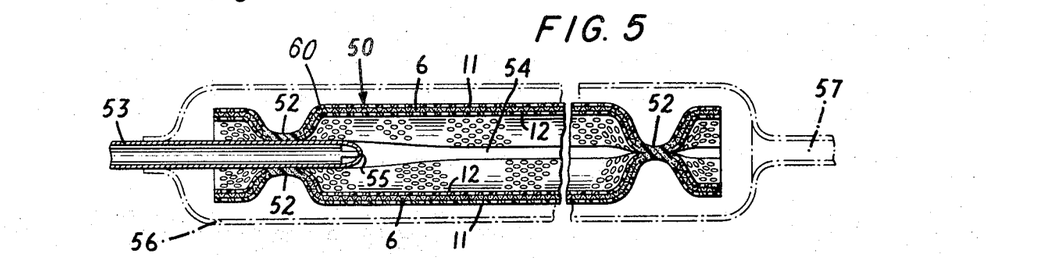
FIG. 5 represents a longitudinal section of the filter element of FIG. 4, taken along the line 5—5 and looking in the direction of the arrows.
Figure 6:
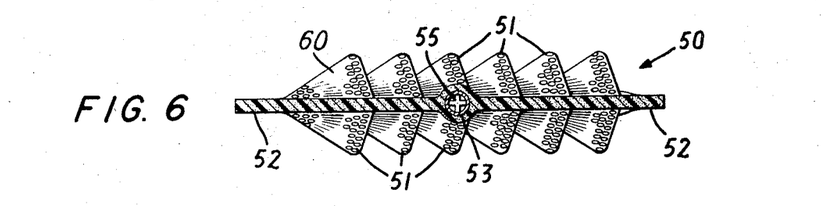
FIG. 6 represents a cross-section of the filter element of FIG. 4, taken along the lines 6—6, and looking in the direction of the arrows.

The filter, element 50 of FIGS. 4 to 6 has as the filter a composite 60 of a two component filter sheet cascade (sheets 41, 42 and spacer sheet 44) in corrugated shingled form, with corrugated folds 51 lying in the plane of the filter element in overlapping fashion. The two filter sheets 41, 42 and separating spacer 44 are arranged exactly as shown in FIG. 3, with the filter sheet 41 outermost and spacer 44 innermost in the closed configuration shown in FIGS. 4 to 6. The corrugated shingled composite 60 is heat-sealed at 52 along its four sides (or along three sides, if folded on itself). The thus-enclosed filter sheet cascade 60 has an outlet line connection via the tube 53 extending into its open interior space 54, and terminating in a caged tip 55. The only inlet into the interior space 54 is via the filter sheet cascade 60. This type of filter element is especially useful in a flexible bag-type of filter unit, the bag 56 being shown in dashed lines in FIGS. 4 and 5. The other end of the bag 56 which can be the blood bag itself can have an inlet tube 57, for reception of blood. It is also possible to have a spiked inlet tub 57 onto the outside of composite 60 in bag 56, in which case it can be heat-sealed to the bag 56 in the same manner as to the filter element. This assembly can then be plugged into a blood bag, as in the case of the filter element of FIGS. 1 and 2, with filter sheet 41 outermost and spacer 44 innermost.

The type of filter element shown in FIGS. 4 to 6 is especially useful for transfusion blood filtration, in which case it can be built into a standard blood bag, but it can also be attached to any type of blood storage reservoir or receptacle.

The corrugated configuration of the filter sheet cascade in this element provides high surface area, and the shingled arrangement of the corrugation makes it possible to provide a flat pouch without the need for a core support, because the spaces between the shingles act as conduits while at the same time the shingled overlapping structure provides structural support. The support or spacer sheet 44 of the two-filter cascade is of heat-softenable material, which softens at a lower temperature than any of the two-filter sheets composing the cascade, so that the filter sheets 41, 42 are not affected under the conditions at which the spacers soften, so that the latter can be fused together in a leak-tight heat seal through the filter sheet pores without deleteriously affectng the filter sheets. The heat seal is easily effected by high frequency heat, and all heat seals can be formed simultaneously, including the heat seals with the tubes.

Having regard to the foregoing disclosures, the following is claimed as the inventive and patentable embodiments thereof:

1. A blood filter element cascade which can be used in blood transfusions without blockage, and which is capable of removing large particles, such as blood clots, and also small particles down to approximately $20\mu$ in size, while passing platelets, red blood cells and at least a substantial proportion of white blood cells, comprising in combination, two filter sheets, arranged in downstream flow sequence in order of progressively increasing fineness;

a. the first filter sheet comprising coarse open netting of plastic filamentary material having a pore size within the range from about 800 to about 4,000 microns, small enough to remove blood clots, and coarse enough to do so without being subject to blocking by the blood clots that are strained out, and b. the second filter sheet comprising an open mesh fabric of plastic monofilaments, having a pore size within the range from about 20 to about 50 microns, capable of removing microemboli, lipids and debris, and gas emboli, that pass through the first filter element while passing platelets, white blood cells, and red blood cells.

2. A blood filter element cascade according to claim 1, in which the first filter sheet is an open-mesh netting prepared by extruding, casting, or molding plastic and having an integral filamentary structure.

3. A blood filter element cascade according to claim 2, in which the plastic material is selected from polypropylene, polyethylene, polyester, polyamide, and polycarbonate.

4. A blood filter element cascade according to claim 1, in which the second filter sheet is a woven squareweave mesh of plastic monofilaments having a pore size within the range from about 20 to about 50 microns, the filaments being locked in place at their crossing points.

5. A blood filter element cascade in accordance with claim 4, in which the monofilaments have a diameter within the range from about 25 to about 50 microns.

6. A blood filter element cascade in accordance with claim 4, in which the plastic monofilaments are of polyester plastic.

7. A blood filter element cascade in accordance with claim 1, in which the filaments are heat set to lock them in place.

8. A blood filter element cascade according to claim 1, in which the two filter sheets are in close juxtaposition, and corrugated or convoluted to provide a high surface area to flow.

9. A blood filter element cascade according to claim 8, in which second filter sheet is juxtaposed to a spacer having a pore size at least as large as the first filter sheet, and within the range from about 800 to about 10,000 microns.

10. A blood filter element cascade according to claim 9, in which the spacer has an uneven surface so as to provide drainage and prevent blocking of the filter sheet by the spacer.

11. A disposable blood filter unit comprising a blood filter element cascade according to claim 1, and a housing having an inlet and an outlet and line connections thereat for fluid flow into and out from the housing, the blood filter element cascade being disposed in the housing across the line of flow therebetween so that fluid flow therebetween must pass through the filter element cascade.

12. A disposable blood filter unit in accordance with claim 11, in which the blood filter element cascade is in the form of a cylinder, and one line connection has a direction fluid flow connection to the interior of the filter cylinder.

13. A disposable filter unit in accordance with claim 11, having a housing made in two portions bonded together.

14. A disposable filter unit in accordance with claim 13, made of plastic, with the portions fused together into one piece.

15. A disposable filter unit in accordance with claim 14, including line connection integral with the housing.

16. A disposable filter unit in accordance with claim 14, having the filter unit bonded to one housing portion.

17. A disposable filter unit in accordance with claim 16, having the filter unit bonded to one housing portion at the outlet with a direct fluid flow line connection from the filtrate-flow side of the filter element to the outlet.

18. A disposable blood filter unit according to claim 11, in which the housing is composed at least of first and second generally channel-shaped housing portions, defining therebetween a fluid chamber open at two sides, the first and second housing portions having opposed sides, with mating sections abutting and bonded in a fluid-tight seal to each other, and the blood filter element cascade in sheet form extending across the fluid chamber, across the line of fluid flow between the fluid ports and held at opposed side portions to at least one of the first and second housing portions, and side caps bonded to the first and second housing portions in a fluid-tight seal across the open sides of the fluid chamber and to the sides of the blood filter element cascade extending along such open sides, the side caps and the housing portions holding the sides of the blood filter element cascade, positioning the blood filter element cascade across the fluid chamber, and sealing all the sides of the blood filter element cascade to the housing, so that the fluid flow between the fluid ports must pass through the blood filter element cascade.

19. A disposable blood filter unit in accordance with claim 18, having four sides, two of the sides being defined by the side caps and two of the sides by the first and second housing portions, and the blood filter element cascade is in four-sided sheet form.

20. A disposable blood filter unit in accordance with claim 19, in which the blood filter element cascade is in four-sided corrugated sheet form.

21. A disposable blood filter unit in accordance with claim 18, in which the first and the second housing portions and the fluid ports therein are arranged so that the fluid ports are coaxial.

22. A disposable blood filter unit in accordance with claim 18, in which all of the housing portions are of plastic material.

23. A disposable blood filter unit in accordance with claim 22, in which the plastic material is a thermoplastic resin.

24. A disposable blood filter unit in accordance with claim 23, in which the thermoplastic resin is polypropylene.

25. A disposable blood filter unit in accordance with claim 22, in which the housing portions are integrated together to form a one-piece housing.

26. A disposable blood filter unit in accordance with claim 18, in which the blood filter element cascade is held at opposed side portions between the mating sections of the first and second housing portions.

27. A disposable blood filter unit in accordance with claim 26, in which the blood filter element cascade is integrated to the mating sections by fusion thereof through the pores of the blood filter element cascade.

28. A disposable blood filter unit in accordance with claim 18, in which the side caps are integrated to the housing portions to form an integral one-piece filter unit.

29. A disposable blood filter unit in accordance with claim 18, in which each of the housing portions includes at least one projecting portion engaging and supporting opposite sides of the blood filter element cascade, and extending with the blood filter element cascade across the fluid chamber.

30. A disposable blood filter unit in accordance with claim 18, in which one housing portion comprises a projecting member holding the opposite end portions of the blood filter element cascade against the other housing portion.

31. A disposable blood filter unit in accordance with claim 30, in which the mating sections of each housing portion have first projecting members extending towards each other, and abutting endwise, with the first housing portion having second projecting members extending internally of the two abutting portions, and engaging the blood filter element cascade at a portion near its edge.

32. A disposable blood filter unit in accordance with claim 30, in which the second projecting members also hold the blood filter element cascade tightly against an internal wall of the second housing portion.

* * * * *

PO-1050
(5/69)

UNITED STATES PATENT OFFICE
CERTIFICATE OF CORRECTION

Patent No. __3,765,537__         Dated __October 16, 1973__

Inventor(s) __David J. Rosenberg__

It is certified that error appears in the above-identified patent and that said Letters Patent are hereby corrected as shown below:

| | | |
|---|---|---|
| Face page, line 8 | : | "Ser. No. 38,356" should be -- Ser. No. 88,356 -- |
| Column 1, line 19 | : | "tp" should be -- to -- |
| Column 1, line 61 | : | "an" should be -- and -- |
| Column 2, line 14 | : | "attribued" should be -- attributed -- |
| Column 3, lines 9 and 10 | : | "tendecny" should be -- tendency -- |
| Column 4, line 44 | : | "filer" should be -- filter -- |
| Column 5, line 1 | : | "Othe" should be -- Other -- |
| Column 6, line 17 | : | "member" should be -- members -- |
| Column 6, line 26 | : | "at" should be -- of -- |
| Column 6, line 63 | : | "sides" should be -- side -- |
| Column 7, line 3 | : | "pair" should be -- pairs -- |
| Column 7, line 3 | : | "finers" should be -- fingers -- |
| Column 7, line 9 | : | "togher" should be -- together -- |
| Column 7, line 21 | : | "Housng" should be -- Housing -- |
| Column 7, line 22 | : | "presed" should be -- pressed -- |

2-178 CIP

PO-1050
(5/69)

UNITED STATES PATENT OFFICE
CERTIFICATE OF CORRECTION

Patent No. 3,765,537     Dated October 16, 1973

Page - 2

Inventor(s) David J. Rosenberg

It is certified that error appears in the above-identified patent and that said Letters Patent are hereby corrected as shown below:

| | |
|---|---|
| Column 8, line 15 | : "tub" should be -- tube -- |
| Column 8, line 29 | : "corrugation" should be -- corrugations -- |
| Column 8, line 41 | : "affectng" should be - affecting -- |
| Column 9, claim 4, line 13 | : "sequare" should be -- square -- |
| Column 9, claim 12, line 52 | : "direction" should be -- direct -- |
| Column 9, claim 15, line 62 | : "connection" should be -- connections -- |

Signed and sealed this 18th day of February 1975.

(SEAL)
Attest:

RUTH C. MASON
Attesting Officer

C. MARSHALL DANN
Commissioner of Patents
and Trademarks

2.

Dedication 3,765,537.—*David J. Rosenberg*, Glen Cove, N.Y. DUAL BLOOD FILTER. Patent dated Oct. 16, 1973. Dedication filed Dec. 31, 1981, by the assignee, *Pall Corp.*

Hereby dedicates to the Public claims 1 through 17 of said patent.
*[Official Gazette November 1, 1983.]*